(12) United States Patent
Zhang et al.

(10) Patent No.: US 12,539,641 B2
(45) Date of Patent: Feb. 3, 2026

(54) METHOD FOR PREPARING ENVIRONMENTALLY-FRIENDLY HIGH-STRENGTH WOOD COMPOSITE MATERIAL

(71) Applicant: Central South University of Forestry and Technology, Changsha (CN)

(72) Inventors: Zhongfeng Zhang, Changsha (CN); Yang Yang, Changsha (CN); Shengbo Ge, Changsha (CN); Feifei Song, Changsha (CN); Lei Zhang, Changsha (CN); Jijuan Zhang, Changsha (CN); Xu Zhang, Changsha (CN)

(73) Assignee: Central South University of Forestry and Technology, Changsha (CN)

( * ) Notice: Subject to any disclaimer, the term of this patent is extended or adjusted under 35 U.S.C. 154(b) by 384 days.

(21) Appl. No.: 18/139,150

(22) Filed: Apr. 25, 2023

(65) Prior Publication Data
US 2024/0139987 A1    May 2, 2024

(30) Foreign Application Priority Data

Oct. 31, 2022   (CN) .......................... 202211346761.3

(51) Int. Cl.
*B27D 1/04*     (2006.01)
*B27D 1/08*     (2006.01)

(52) U.S. Cl.
CPC .............. *B27D 1/04* (2013.01); *B27D 1/083* (2013.01)

(58) Field of Classification Search
CPC ................................. B27D 1/04; B27D 1/083
See application file for complete search history.

(56) References Cited

U.S. PATENT DOCUMENTS

2019/0232522 A1* 8/2019 Page ................... D21J 1/04
2023/0310699 A1* 10/2023 Tsuzuki ............. C08B 37/003
424/443

FOREIGN PATENT DOCUMENTS

CN          111138719 A  *  5/2020  ............ C09D 11/14
CN          112140265 B     12/2021
(Continued)

OTHER PUBLICATIONS

English translation of CN-111138719-A retrieved from Espacenet (Year: 2025).*

(Continued)

*Primary Examiner* — Abbas Rashid
*Assistant Examiner* — Elisa H Vera
(74) *Attorney, Agent, or Firm* — IceMiller LLP

(57) ABSTRACT

Disclosed is a method for preparing an environmentally-friendly high-strength wood composite material, which includes the following steps: S1. pulverizing wood into a wood flour, adding the wood flour to an acid solution to obtain a first mixture, ball milling the first mixture to obtain a ball milled mixture, and filtering the ball milled mixture, to obtain a dually-treated wood flour; S2. adding the dually-treated wood flour to a first alkaline solution, and performing a neutralization reaction, to obtain a second mixture; S3. adding an alkaline solution to the second mixture to remove part of lignin, to obtain a lignin-partially removed wood flour; S4. washing the lignin-partially removed wood flour with anhydrous ethanol and drying, to obtain a dried lignin-partially removed wood flour; S5. subjecting the dried lignin-partially removed wood flour to hot pressing, followed by cooling, to obtain the environmentally-friendly high-strength wood composite material.

10 Claims, 1 Drawing Sheet

(56) References Cited

FOREIGN PATENT DOCUMENTS

| | | | |
|---|---|---|---|
| CN | 114179186 B | | 8/2022 |
| JP | 2021127383 A | * | 9/2021 |

OTHER PUBLICATIONS

English translation of JP-2021127383-A retrieved form Espacenet (Year: 2025).*

* cited by examiner

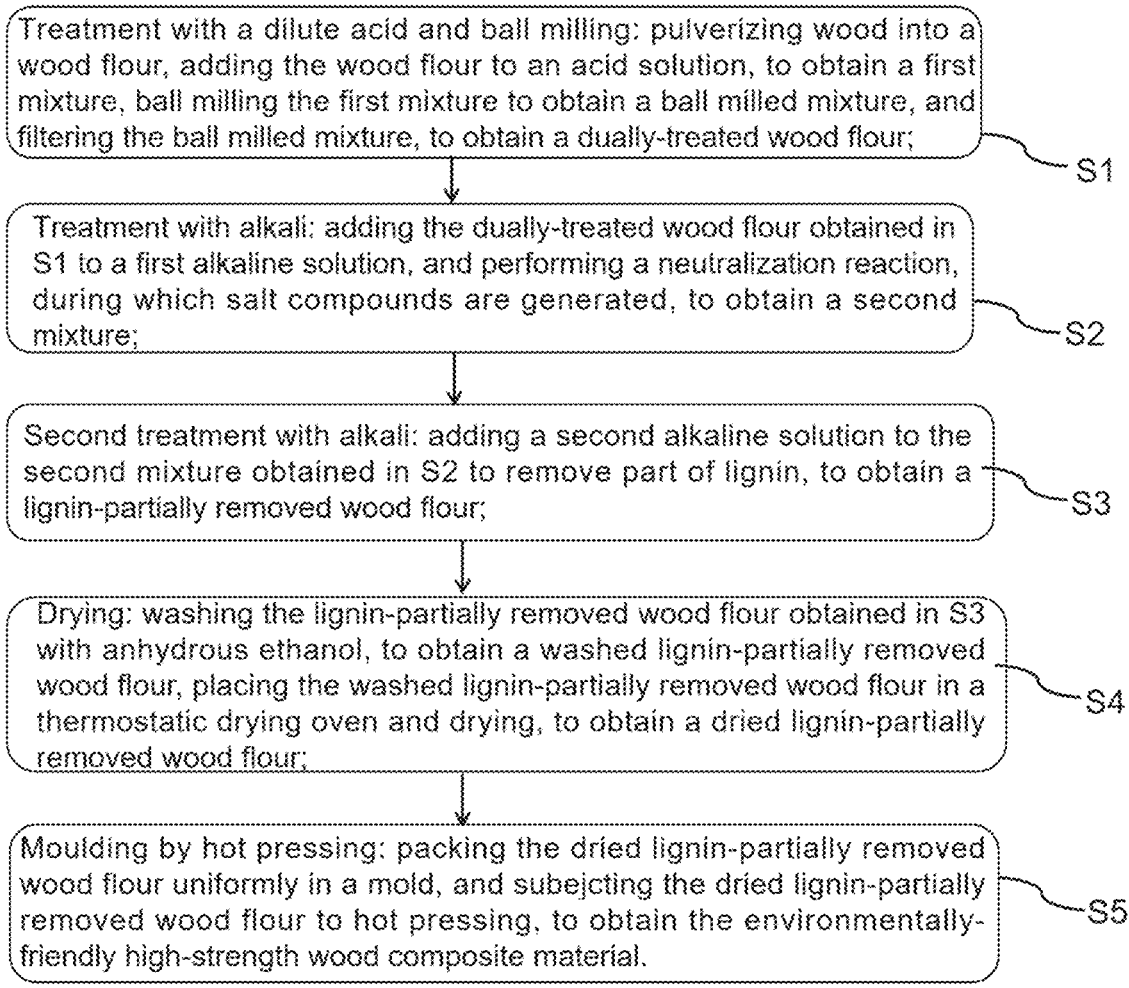

METHOD FOR PREPARING ENVIRONMENTALLY-FRIENDLY HIGH-STRENGTH WOOD COMPOSITE MATERIAL

CROSS REFERENCE TO RELATED APPLICATION

This application claims the benefit and priority of Chinese Patent Application No. 202211346761.3, entitled "Method for Preparing an Environmentally-Friendly High-Strength Wood Composite Material" filed on Oct. 31, 2022, the disclosure of which is incorporated by reference herein in its entirety as part of the present application.

TECHNICAL FIELD

The present disclosure relates to the technical field of wood composites, in particular to a method for preparing an environment-friendly high-strength wood composite material.

BACKGROUND ART

Traditional biological composites are materials with excellent performance, which are prepared by compositing renewable resources (as raw material) with other materials through biological, chemical or physical methods. Plywood, as the most important biological composite material, has been widely used in construction, furniture, decoration and other fields. However, synthetic adhesives are inevitably used in the production of plywood. The synthetic adhesive would not only accelerate the consumption of fossil energy, but also generally release formaldehyde during the use, endangering human health. At present, there are mainly two kinds of environmentally-friendly wood composite materials: one is the wood composite material produced by using improved formaldehyde-free adhesive and the other is the formaldehyde-free wood composite without adhesives.

For example, CN114179186B discloses a method for preparing a composite wood panel by using microwave curing, in which a synthetic microwave absorbing agent is used so that the lignin modified phenolic resin adhesives with cross-linked structure is solidified to form nails for stabilizing structure, thereby preparing composite wood panels. As an improved formaldehyde-free adhesive, the lignin modified phenolic resin adhesive conforms to the path of green sustainable development and environmental friendliness. However, compared with the prior art adhesive, such adhesive has a cumbersome preparation process, which is not conducive to large-scale production.

For another example, CN112140265B discloses a method for preparing a adhesive-free molded wood panel. In the method, an insoluble resin is formed by reacting natural cellulose, hemicellulose and lignin at high temperature and high pressure, and used as an adhesive for wood flour to produce a natural, green and environmentally-friendly adhesive-free molded wood panel. Although the adhesive-free means are used in the above existing technologies, the heat treatment at high temperature would result in significantly-reduced mechanical properties of wood, and would lead to the pyrolysis of hemicellulose, during which acidic substances are generated to provide an environment where wood rot fungi parasitize and multiply, thereby accelerating the decay of the wood material.

Therefore, it is urgent to develop an environmentally-friendly, light, thin, and high-strength wood composite material, which has widely available raw materials and simple production process.

SUMMARY

The present disclosure overcomes the shortcomings of the prior art and provides a method for preparing an environmentally-friendly high-strength wood composite material. In the method, a treatment with a dilute acid, a ball milling, a treatment with an alkali, a second treatment with an alkali, and a moulding by hot pressing are involved, so that part of lignin and hemicellulose in wood flour are removed, making the cell wall softer, resulting in that the wood flour is easy to be mechanically compressed at a lower temperature, to prepare a light, thin, high-strength and environmentally friendly wood composite material.

In order to achieve the above objective, the present disclosure provides a technical solution: a method for preparing an environmentally-friendly high-strength wood composite material, which comprises S1. treatment with a dilute acid and ball milling: pulverizing wood into a wood flour, adding the wood flour to an acid solution to obtain a first mixture, ball milling the first mixture to obtain a ball milled mixture, and filtering the ball milled mixture, to obtain a dually-treated wood flour;

S2. treatment with alkali: adding the dually-treated wood flour obtained in S1 to a first alkaline solution, and performing a neutralization reaction, during which salt compounds are generated, to obtain a second mixture;

S3. second treatment with alkali: adding a second alkaline solution to the second mixture obtained in S2 to remove part of lignin, to obtain a lignin-partially removed wood flour;

S4: drying: washing the lignin-partially removed wood flour obtained in S3 with anhydrous ethanol, to obtain a washed lignin-partially removed wood flour, placing the washed lignin-partially removed wood flour in a thermostatic drying oven and drying, to obtain a dried lignin-partially removed wood flour; and S5: moulding by hot pressing: packing the dried lignin-partially removed wood flour uniformly in a mold, sending the mold to a press, subjecting the dried lignin-partially removed wood flour to hot pressing, to obtain a hot-pressed material, and cooling the hot-pressed material, to obtain the environmentally-friendly high-strength wood composite material.

In some embodiments of the present disclosure, the acid solution is a dilute phosphoric acid solution, which has a concentration of 6-10 wt %.

In some embodiments of the present disclosure, the first alkaline solution and the second alkaline solution each are sodium hydroxide solution having a concentration of 1-6 g/L.

In some embodiments of the present disclosure, the wood flour obtained in S1 has an average particle size of 40-60 mesh.

In some embodiments of the present disclosure, the method further comprises in S1, after pulverizing, subjecting the wood flour to drying pretreatment to a moisture content of 6-10%.

In some embodiments of the present disclosure, a molar ratio of phosphoric acid in the acid solution to sodium hydroxide in the first alkaline solution is in a range of 2:1 to 4:1, and a molar ratio of phosphoric acid in the acid solution to sodium hydroxide in the second alkaline solution is 1:1.

In some embodiments of the present disclosure, in S1, the treatment with a dilute acid is performed at a temperature of 80-100° C.

In some embodiments of the present disclosure, in S5, the dried lignin-partially removed wood flour is hot-pressed at a temperature of 100-120° C. and a pressure of 30-40 MPa for 1-2 h, such that the lignin-partially removed wood flour is completely densified by mechanical compression.

In some embodiments of the present disclosure, in S1, the ball milling is performed at a rotational speed of 280-300 rpm for 2-2.5 h by using grinding balls with an average diameter of 5-7 mm, in a number of 80-120 grinding balls per liter of the first mixture.

In some embodiments of the present disclosure, in S4, the washed lignin-partially removed wood flour is placed in a thermostatic drying oven at a temperature of 40-60° C., and dried therein for 12-24 h.

The present disclosure solves the defects as described in the background art, and has the following beneficial effects:

(1) The present disclosure provides a method for preparing an environmentally-friendly high-strength wood composite material, in which a treatment with a dilute acid, a ball milling, a treatment with an alkali, a second treatment with an alkali, and a moulding by hot pressing are involved, so that part of lignin and hemicellulose in the wood flour are removed, making the cell wall softer and exposing more pores and hydroxyl groups, and resulting in that the wood flour is easy to be mechanically compressed at a lower temperature. The exposed pores could package salt compounds, and the salt compounds and the wood flour form an integrated structure during the hot pressing, reducing the pores in the wood, realizing the close arrangement of the wood flour particles, improving the connection strength among the wood flour, and thereby ensuring a good pressing effect and a high surface strength of the wood composite material.

(2) In the present disclosure, the complete densification of wood flour is realized by means of the residual lignin and hemicellulose in the wood flour as well as the mechanical compression. Compared with adhesives in the prior art, the method according to the present disclosure conforms to a preparation path by green and environmentally-friendly process.

(3) In the present disclosure, salt compounds are generated from the neutralization reaction between medium-strong acids and strong alkalis. Firstly, this reaction is to remove excess acidic substances, which slows down the decay of wood compared with the prior art process. Secondly, one or more of $Na_3PO_4$, $NaH_2PO_4$ and $Na_2HPO_4$ are generated from this reaction, which could fill the gaps among wood flours and improve the mechanical strength of wood materials. Thirdly, heat is generated during the reaction, which provides heat required in the next process.

(4) In some embodiments of the present disclosure, the treatment with a dilute acid is performed at a temperature of 80-100° C. Compared with 150-200° C. in the prior art process, the treatment in the present disclosure is performed at a reduced temperature. On the one hand, the treatment with a dilute acid solution is performed at a lower temperature to remove hemicellulose without affecting cellulose and lignin. On the other hand, the lower temperature can prevent over-hydrolysis of hemicellulose by the dilute acid solution.

(5) In the present disclosure, the treatment with dilute acid, ball milling, treatment with alkali, second treatment with alkali, and moulding by hot pressing are performed at a temperature not higher than 120° C. Compared with the high temperature in the prior art, the impact of the high temperature on the mechanical properties of wood material is reduced to the maximum in the present disclosure. With a thickness reduced by 40-80% compared with the prior art wood material, and a density 2-3 times larger than that of the prior art wood material, the tensile strength of the wood composite material according to the present disclosure could reach 568 MPa. Due to the use of wood flour obtained by pulverizing wood as raw material, wood processing leftovers and waste materials could be fully used as raw material, and without any sizing required in the method, the wood composite material could be recovered 100%.

BRIEF DESCRIPTION OF THE DRAWINGS

In order to more clearly explain the embodiments of the present disclosure or the technical solutions in the prior art, the following will briefly introduce the drawings needed in the description of embodiments of the present disclosure or the prior art. It is obvious that the drawings in the following description are only some embodiments recorded in the present disclosure. For ordinary technicians in the art, other drawings can also be obtained from these drawings without creative labor.

FIG. 1 is a flowchart of one embodiment of the method for preparing an environmentally-friendly high-strength wood composite material according to the present disclosure.

DETAILED DESCRIPTION OF THE EMBODIMENTS

The following will give a clear and complete description of the technical solution in the embodiments of the present disclosure in conjunction with the drawings in the embodiments of the present disclosure. Obviously, the described embodiments are only part of the embodiments of the present disclosure, not all of them. Based on the embodiments in the present disclosure, all other embodiments obtained by ordinary technicians in the art without creative labor fall within the scope of the present disclosure.

Many specific details are described in the following description to fully understand the present disclosure, but the present disclosure can also be implemented in other ways different from those described here. Therefore, the scope of the present disclosure is not limited to the specific embodiments disclosed below.

As shown in FIGURE, the present disclosure provides a method for preparing an environmentally-friendly high-strength wood composite material, comprising S1. treatment with a dilute acid and ball milling: pulverizing wood into wood flour, adding the wood flour to an acid solution to obtain a first mixture, ball milling the first mixture to obtain a ball milled mixture, and filtering the ball milled mixture, to obtain a dually-treated wood flour;

S2. treatment with alkali: adding the dually-treated wood flour obtained in S1 to a first alkaline solution, and performing a neutralization reaction, during which salt compounds are generated, to obtain a second mixture;

S3. second treatment with alkali: adding a second alkaline solution to the second mixture obtained in S2 to remove part of lignin, to obtain a lignin-partially removed wood flour;

S4: drying: washing the lignin-partially removed wood flour with anhydrous ethanol, to obtain a washed lignin-partially removed wood flour, placing the washed lignin-partially removed wood flour in a thermostatic drying oven, and drying, to obtain a dried lignin-partially removed wood flour;

S5: moulding by hot pressing: packing the dried lignin-partially removed wood flour uniformly in a mold, sending the mold to a press, subjecting the dried lignin-partially removed wood flour to hot pressing to obtain a hot-pressed material, and cooling the hot-pressed material, to obtain the environmentally-friendly high-strength wood composite material.

In some embodiments of the present disclosure, the ball milling in S1 is performed at a rotational speed of 280-300 rpm for 2-2.5 h by using grinding balls with an average diameter of 5-7 mm and in a number of 80-120 grinding balls per liter of the first mixture, to obtain a dually-treated wood flour.

In some embodiments, a solid-liquid ratio of the wood flour to the acid solution is 1:6 (kg/L). In some embodiments, the acid solution is a dilute phosphoric acid solution, which has a concentration of 6-10 wt %. The dilute phosphoric acid solution at ambient temperature conditions is used to remove most of hemicellulose. During this process, less cellulose and lignin in the wood flour are lost. Compared with the treatment at high temperature in the prior art, this process would not result in reduced mechanical properties of the composite panel. In addition, the water resistance of the wood material can be significantly improved by treating the wood flour with a dilute phosphoric acid solution and ball milling.

In some embodiments, the treatment with a dilute acid is performed at a temperature of 80-100° C. Compared with 150-200° C. in the prior art, the treatment in the present disclosure is performed at a reduced temperature. On the one hand, the treatment with a dilute acid solution is performed at a lower temperature to remove hemicellulose without affecting cellulose and lignin. On the other hand, the lower temperature can prevent over-hydrolysis of hemicellulose by a dilute acid solution, which otherwise would be converted to acetaldehyde, etc.

In some embodiments of the present disclosure, the first alkaline solution in S2 is a sodium hydroxide solution, which has a concentration of 1-6 g/L. At this stage, a neutralization reaction between the sodium hydroxide solution and the dilute phosphoric acid remained in the wood flour is performed. The functions of the neutralization reaction are as follows: 1. this reaction is to remove the excess acidic substances, which slows down the decay of wood compared with the prior art process; 2. one or more of $Na_3PO_4$, $NaH_2PO_4$ and $Na_2HPO_4$ are generated from the reaction, which could fill the gaps among wood flours and improve the mechanical strength of wood materials; 3. heat is generated during this reaction, which provides the heat required in the next process.

In some embodiments, a molar ratio of the phosphoric acid to the sodium hydroxide in S2 is in a range of 2:1 to 4:1.

In the present disclosure, in S3, a sodium hydroxide solution is further added to the second mixture obtained in S2. With the rise of the temperature of wood flour, the above-mentioned $NaH_2PO_4$ and $Na_2HPO_4$ react with the sodium hydroxide solution to generate $Na_2HPO_4$ or $Na_3PO_4$. Therefore, at least $Na_3PO_4$ is generated in S3, and optionally $Na_2HPO_4$ exists in the product mixture obtained in S3. During the process, part of lignin in the wood flour is removed.

It should be noted that the second treatment with an alkali in S3 is performed at a relatively mild condition. In some embodiments, it is performed at a temperature of 60° C. to 90° C. In some embodiments, a molar ratio of phosphoric acid in the dilute phosphoric acid solution to sodium hydroxide in the sodium hydroxide solution in S3 is 1:1.

In S4, because $Na_3PO_4$ and $Na_2HPO_4$ are soluble in water, but not in ethanol, the lignin-partially removed wood flour thus is washed with ethanol to reduce the loss of products. In some embodiments, the washed lignin-partially removed wood flour is placed in a thermostatic drying oven at a temperature of 40-60° C. and dried for 12-24 h.

In some embodiments, the dried lignin-partially removed wood flour is hot pressed at a temperature of 100-120° C., and a pressure of 30-40 MPa for 1-2 h, such that the wood flour is completely densified by mechanical compression. During the mechanical compression, the products generated in S2 or S3 fill in the gaps among the wood flours, which further improves the arrangement degree and compactness degree of cellulose in the wood composite material, thereby improving the mechanical properties of the wood composite material.

In S1, S2 and S3, a treatment with a dilute acid, a treatment with an alkali, and a second treatment with an alkali are performed in sequence, so that part of lignin and hemicellulose in the wood flour are removed, thus making the cell wall softer and exposing more pores and hydroxyl groups, resulting in that the wood flour is easy to be mechanically compressed at a lower temperature. In addition, the exposed pores could package salt compounds, and the salt compounds and the wood flour form an integrated structure during the hot pressing, reducing the pores in the wood, realizing the close arrangement of the wood flour particles, improving the connection strength among the wood flour, and thereby ensuring a good pressing effect and a high surface strength of the wood composite material.

It should be noted that, in S1, S2 and S3 according to the present disclosure, lignin and hemicellulose are not completely removed, and part of them are retained for the purpose of binding the wood flour.

In some embodiments, the method further comprises, in S1, after pulverizing the wood flour is subjected to a dry pretreatment to a moisture content of 6-10%.

In the present disclosure, S1-S4 are performed at a temperature not higher than 120° C. Compared with the high temperature in the prior art, the impact of the high temperature on the mechanical properties of wood material is reduced to the maximum in the present disclosure. In addition, the thickness of the wood composite material prepared in the present disclosure could be reduced by 40% to 80% compared with that of the wood material in the prior art, but the wood composite material prepared in the present disclosure has a density 2 to 3 times larger than that of the prior art wood composite material. The wood composite material prepared in the present disclosure has good mechanical properties, and good heat and water resistance, and can be widely used in various decoration and construction materials. Due to the use of wood flour obtained by pulverizing wood as raw material, wood processing leftovers and waste materials could be fully used as raw material, and without any sizing required in the method, the wood composite material could be recovered 100%.

EXAMPLES

Example 1

The wood was pulverized into a wood flour with a particle size of 40-60 mesh, and the wood flour was added to 6 wt % dilute phosphoric acid solution in a solid-liquid ratio of 1:6 (kg/L), obtaining a first mixture. The first mixture was ball milled (using grinding balls with an average diameter of 5 mm in a number of 120 grinding balls per liter of the first mixture) at 120° C. and a rotation speed of 300 rpm for 2 hours, obtaining a ball-milled mixture. The ball-milled mixture was filtered, obtaining a dually-treated wood flour. The dually-treated wood flour was added to a sodium hydroxide solution (the molar ratio of phosphoric acid in the dilute phosphoric acid solution to the sodium hydroxide in the sodium hydroxide solution being 3:1), and the phosphoric acid and the sodium hydroxide underwent a neutralization reaction at 100° C., generating salt compounds, and obtaining a second mixture. A sodium hydroxide solution was added to the second mixture (the molar ratio of the phosphoric acid in the dilute phosphoric acid solution to the sodium hydroxide in the sodium hydroxide solution added being 1:1) at 90° C. to remove part of lignin, obtaining a lignin-partially removed wood flour. The lignin-partially removed wood flour obtained was washed with anhydrous ethanol, obtaining a washed lignin-partially removed wood flour. The washed lignin-partially removed wood flour was placed in a thermostatic drying oven at 60° C. and dried, obtaining a dried lignin-partially removed wood flour. The dried lignin-partially removed wood flour was uniformly packed in a mold with a packing thickness of 15 mm. The mold was then sent into a press, and the lignin-partially removed wood flour therein was then hot pressed at 30 MPa and 100° C. for 1 h. The hot-pressed material was stored under natural conditions, so that an equilibrium moisture content (i.e., a moisture content of 9-12%) was reached, finally obtaining an environmentally-friendly high-strength wood composite material.

AGS-X universal mechanical testing machine was used to test the mechanical properties of the Panel (i.e., the wood composite material). Panel samples with a dimension of 50×8×2.5 mm$^3$ (Length×Width×Thickness) were subjected to this test. Two ends of the panel sample along the wide direction were clamped and a tensile stress was applied thereon, thereby obtaining a tensile stress-strain curve of the tested sample. The tensile strength of the panel sample (i.e., the stress when the material underwent the maximum uniform plastic deformation) is 568 MPa, which is much higher than that of the conventional medium-density fiberboard and high-density fiberboard, and even comparable to steel. With excellent mechanical properties, the water resistance of the panel is also better than that of natural wood. Water resistance test was also performed on the panel sample. In the test, the sample was completely immersed in water, taken out after a period of time, and weighed, and the water absorption rate was calculated. When the immersing time was 24 hours, the water absorption rate was 48.87%; when the immersing time was 48 hours, the water absorption rate was 51.13%; when the water absorption was saturated, the water absorption rate was constant after that. However, the water absorption was 64.10% when immersing natural wood for 6 h, and increased over time, and finally reached 155.85%. It shows that the wood composite material prepared in the present disclosure has good water resistance. In addition, the dilute phosphoric acid solution used in the method can be recycled.

Comparative Example 1 (Blank Control)

The wood was pulverized into a wood flour with a particle size of 40-60 mesh, and the wood flour was added to water in a solid-liquid ratio of 1:6 (kg/L), obtaining a first mixture. The first mixture was ball milled (using grinding balls with an average diameter of 5 mm in a number of 120 grinding balls per liter of solution) at 120° C. and a rotation speed of 300 rpm for 2 hours, obtaining a ball-milled mixture. The ball-milled mixture was filtered, obtaining a ball-milled wood flour. The ball-milled wood flour was washed with anhydrous ethanol, obtaining a washed ball-milled wood flour. The washed ball-milled wood flour was placed in a thermostatic drying oven at 60° C. and dried, obtaining a dried ball-milled wood flour. The dried ball-milled wood flour was uniformly packed in a mold with a packing thickness of 15 mm. The mold was sent into a press, and the wood flour therein was then hot pressed at 30 MPa and 100° C. for 1 h. The hot-pressed material was stored under natural conditions, so that an equilibrium moisture content (i.e., a moisture content of 9-12%) was reached, finally obtaining an environmentally-friendly high-strength wood composite material.

The test results of mechanical properties show that the tensile strength of the wood composite material is 94 MPa. It shows that the mechanical strength of the panel prepared without treatments with acid and alkaline solution is lower than that of the panel prepared with these treatments. Due to the high strength of chemical bonds in wood flour cells, mechanical action alone without the auxiliary treatment with chemical reagents can only destroy the cell structure and could not break the connecting bonds between lignin and hemicellulose.

Comparative Example 2

The wood was pulverized into a wood flour with a particle size of 40-60 mesh, and the wood flour was added to 6 wt % dilute phosphoric acid solution in a solid-liquid ratio of 1:6 (kg/L), obtaining a first mixture. The first mixture was filtered, obtaining an acid-treated wood flour. The acid-treated wood flour was added to a sodium hydroxide solution (the molar ratio of the phosphoric acid in the dilute phosphoric acid solution to the sodium hydroxide in the sodium hydroxide solution being 3:1), and the phosphoric acid and the sodium hydroxide underwent a neutralization reaction at 100° C., generating salt compounds and obtaining a second mixture. A sodium hydroxide solution was added to the second mixture (the molar ratio of the phosphoric acid in the dilute phosphoric acid solution to the sodium hydroxide in the sodium hydroxide solution being 1:1) at 90° C. to remove part of lignin, obtaining a lignin-partially removed wood flour. The lignin-partially removed wood flour was washed with anhydrous ethanol, obtaining a washed lignin-partially removed wood flour. The washed lignin-partially removed wood flour was placed in a thermostatic drying oven at 60° C. and dried, obtaining a dried lignin-partially removed wood flour. The dried lignin-partially removed wood flour was uniformly packed in a mold with a packing thickness of 15 mm. The mold was sent into a press, and the lignin-partially removed wood flour therein was then hot pressed at 30 MPa and 100° C. for 1 h. The hot-pressed material was stored under natural conditions, so that an equilibrium moisture content (i.e., a moisture content of 9-12%) was reached, finally obtaining an environmentally-friendly high-strength wood composite material.

The test results of mechanical properties show that the tensile strength of the prepared wood composite material is 239 MPa. It shows that the treatment with an acid alone could not effectively destroy the cell structure and remove hemicellulose.

Comparative Example 3

The wood was pulverized into a wood flour with a particle size of 40-60 mesh, and the wood flour was added to 6 wt % dilute phosphoric acid solution in a solid-liquid ratio of 1:6 (kg/L), obtaining a first mixture. The first mixture was ball milled (using grinding balls with an average diameter of 5 mm in a number of 120 grinding balls per liter of the first mixture) at 120° C. and a rotation speed of 300 rpm for 2 hours, obtaining a ball milled mixture. The ball milled mixture was filtered, obtaining a dually-treated wood flour.

The dually-treated wood flour was washed with anhydrous ethanol, obtaining a washed dually-treated wood flour. The washed dually-treated wood flour was placed in a thermostatic drying oven at 60° C. and dried, obtaining a dried dually-treated wood flour.

The dried dually-treated wood flour was uniformly packed in a mold with a packing thickness of 15 mm. The mold was sent into a press, and the wood flour therein was then hot pressed at 30 MPa and 100° C. for 1 h. The hot-pressed material was stored under natural conditions, so that an equilibrium moisture content (i.e., a moisture content of 9-12%) was reached, finally obtaining an environmentally-friendly high-strength wood composite material.

The test results of mechanical properties show that the tensile strength of wood composite material is 298 MPa. It shows that the mechanical properties of wood material can be partially improved by removing hemicellulose from the wood flour alone.

In addition, the present disclosure also verified that, when treating similarly as Example 1 but using 3 wt % phosphoric acid solution, the wood composite material prepared thereby exhibits a tensile strength of 432 MPa; when treating similarly as Example 1 but using 12 wt % phosphoric acid solution, the wood composite material prepared thereby exhibits a tensile strength of 483 MPa. When using a wood flour with a particle size of 20-40 mesh and treating similarly as Example 1, the wood composite material prepared thereby exhibits a tensile strength of 493 MPa. When using a wood flour with a particle size of 60-80 mesh and treating similarly as Example 1, the wood composite material prepared thereby exhibits a tensile strength of 522 MPa. It shows that the particle size (too large or too small) affects the binding of plates during the hot pressing.

Based on the above descriptions and inspired by the above ideal embodiments, technicians in the relevant art could make various changes and modifications without deviating from the technical concept of the present disclosure. The technical scope of the present disclosure is not limited to the contents of the specification, but should be determined according to the scope of the claims.

What is claimed is:

1. A method for preparing an environmentally-friendly high-strength wood composite material, comprising:
   S1. treatment with a dilute acid and ball milling: pulverizing wood into a wood flour, adding the wood flour to an acid solution, to obtain a first mixture, ball milling the first mixture to obtain a ball milled mixture, and filtering the ball milled mixture, to obtain a dually-treated wood flour;
   S2. treatment with alkali: adding the dually-treated wood flour obtained in S1 to a first alkaline solution, and performing a neutralization reaction, during which salt compounds are generated, to obtain a second mixture;
   S3. second treatment with alkali: adding a second alkaline solution to the second mixture obtained in S2 to remove part of lignin, to obtain a lignin-partially removed wood flour;
   S4. drying: washing the lignin-partially removed wood flour obtained in S3 with anhydrous ethanol, to obtain a washed lignin-partially removed wood flour, placing the washed lignin-partially removed wood flour in a thermostatic drying oven and drying, to obtain a dried lignin-partially removed wood flour; and
   S5. moulding by hot pressing of the dried lignin-partially removed wood flour: packing the dried lignin-partially removed wood flour uniformly in a mold, sending the mold to a press, subjecting the dried lignin-partially removed wood flour to hot pressing at a temperature of 100-120° C. and a pressure of 30-40 MPa for 1-2 h to obtain a hot-pressed material, and cooling the hot-pressed material, to obtain the environmentally-friendly high-strength wood composite material.

2. The method as claimed in claim 1, wherein the acid solution is a dilute phosphoric acid solution having a concentration of 6-10 wt %.

3. The method as claimed in claim 1, wherein the first alkaline solution and the second alkaline solution each are sodium hydroxide solution having a concentration of 1-6 g/L.

4. The method as claimed in claim 1, wherein the wood flour obtained in S1 has an average particle size of 40-60 mesh.

5. The method as claimed in claim 1, further comprising in S1, after pulverizing, subjecting the wood flour to drying pretreatment to a moisture content of 6-10%.

6. The method as claimed in claim 1, wherein a molar ratio of phosphoric acid in the acid solution to sodium hydroxide in the first alkaline solution is in a range of 2:1 to 4:1, and a molar ratio of phosphoric acid in the acid solution to sodium hydroxide in the second alkaline solution is 1:1.

7. The method as claimed in claim 1, wherein in S1, the treatment with a dilute acid is performed at a temperature of 80-100° C.

8. The method as claimed in claim 1, wherein in S1, the ball milling is performed at a rotational speed of 280-300 rpm for 2-2.5 h by using grinding balls with an average diameter of 5-7 mm, in a number of 80-120 grinding balls per liter of the first mixture.

9. The method as claimed in claim 1, wherein in S4, the washed lignin-partially removed wood flour is placed in a thermostatic drying oven at a temperature of 40-60° C., and dried therein for 12-24 h.

10. A method for preparing an environmentally-friendly high-strength wood composite material, consisting of:
   S1. treatment with a dilute acid and ball milling: pulverizing wood into a wood flour, adding the wood flour to an acid solution, to obtain a first mixture, ball milling the first mixture to obtain a ball milled mixture, and filtering the ball milled mixture, to obtain a dually-treated wood flour;
   S2. treatment with alkali: adding the dually-treated wood flour obtained in S1 to a first alkaline solution, and performing a neutralization reaction, during which salt compounds are generated, to obtain a second mixture;
   S3. second treatment with alkali: adding a second alkaline solution to the second mixture obtained in S2 to remove part of lignin, to obtain a lignin-partially removed wood flour;
   S4: drying: washing the lignin-partially removed wood flour obtained in S3 with anhydrous ethanol, to obtain a washed lignin-partially removed wood flour, placing the washed lignin-partially removed wood flour in a thermostatic drying oven and drying, to obtain a dried lignin-partially removed wood flour; and
   S5: moulding by hot pressing of the dried lignin-partially removed wood flour: packing the dried lignin-partially removed wood flour uniformly in a mold, sending the mold to a press, subjecting the dried lignin-partially removed wood flour to hot pressing at a temperature of 100-120° C. and a pressure of 30-40 MPa for 1-2 h to obtain a hot-pressed material, and cooling the hot-pressed material, to obtain the environmentally-friendly high-strength wood composite material.

* * * * *